Nov. 2, 1954    J. M. POCHE    2,693,162
AMPHIBIOUS VEHICLE WITH PIVOTED TRACK
Filed Dec. 11, 1951

INVENTOR.
BY John Morris Poche
John H. Ruckman
Attorney

United States Patent Office 2,693,162
Patented Nov. 2, 1954

2,693,162

AMPHIBIOUS VEHICLE WITH PIVOTED TRACK

John Morris Poche, Mississippi City, Miss.

Application December 11, 1951, Serial No. 261,045

1 Claim. (Cl. 115—1)

My invention relates to improvements in amphibious vehicles. It relates particularly to that type of vehicles having a power plant which operates endless tracks the lower stretches of which are adapted to engage the terrain for propelling the vehicle forwardly on account of successive portions of the tracks being brought into contact with the terrain. The term terrain is intended to include all overlay on the surface of the earth such as hard or soft soil, snow, ice, and liquid condition.

A prime object of this invention therefore is to provide a track laying vehicle having the combination of a main body carrying a power plant and means for controlling the operation of endless tracks.

A special object is to provide traction units consisting of three pontoons equipped with tracks, one of the pontoons being a large one known as a belly or middle track arrangement, and the other two being smaller with one positioned on each side respectively of the middle one and all having their forward ends pivotally mounted on an axle supported by the body member and with hydraulic means for controlling the operation of the vehicle so as to keep the tractive surface of the tracks in contact with uneven surfaces of the terrain.

Another object is to provide a spring suspension for the large pontoon in relation to the main body so as to absorb shock when said pontoon raises and lowers according to the contour of the terrain.

Another object is to provide a belt which is held in engagement with the inner surface of the track which passes around the large pontoon so that soft material such as mud will be compressed against the belt as it travels with the track.

The said objects I have accomplished by means now to be described in detail and claimed, it being understood that changes in the embodiment of invention herein disclosed can be made within the scope of what is claimed without departing from the spirit of the invention.

The novel features which I believe to be characteristic of this invention are set forth with particularity in the appended claim. The invention itself, however, both as to organization and method of operation, together with additional objects and advantages thereof, will be best understood from the following description of a specific embodiment when read in connection with the accompanying drawing in which:

Figure 1:
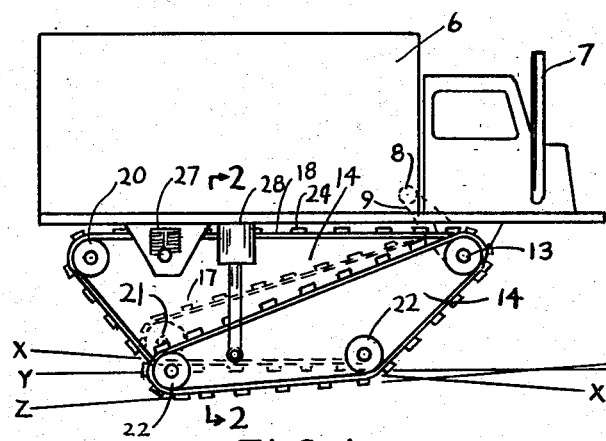
Fig. 1 is a side elevational view of the vehicle.

Referring to the construction shown in the drawing, the numeral 6 designates the body of a vehicle on the front end of which a power plant is mounted and provided with an exhaust pipe 7. A shaft 8 driven in known manner by the power plant operates a flexible element 9 adapted to rotate gears 10, 11, and 12 mounted on an axle 13 with said gears adapted to drive three endless tracks which respectively run around a middle large pontoon 14 and around side pontoons 15 and 16, the front ends of which are mounted on the axle 13. The three tracks are designated 17, 18 and 19. The middle track 18 is trained around a roller 20 and around one of the gears. The track 17 is trained around a roller 21 and around one of the gears. The track 19 is trained around rollers 22 and around one of the gears.

Figure 5:
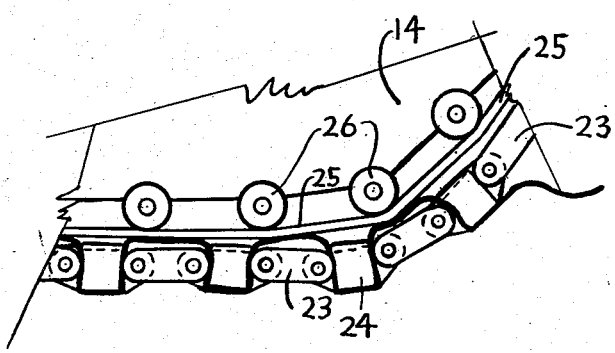
Fig. 5 is a fragmentary view substantially on the line 5—5 of Fig. 3 but on an enlarged scale.

The middle track 18 as indicated in Fig. 5 includes opposite link members 23 connected by cross slats or grousers 24. In order to eliminate friction that would be caused by the dragging or scraping over the terrain, a belt 25 is held in engagement with the inner surfaces of the grousers 24 by idler rollers 26 mounted on the pontoon 14. This belt travels together with the track 18 around the pontoon 14. The heavy black line indicates soft mud which is retained and compressed against the belt 25 and the members of the track 17. This aids in supporting the weight of the vehicle and traction is increased. The pontoon 14 is provided near its rear with a spring suspension 27 attached to the bottom of the body 6. On level terrain, this will act to keep the middle track in alinement with the side tracks, but will permit it to raise and lower when the contour of the terrain is uneven, and will absorb shock and permit an even contact with soft uneven terrain.

Figure 2:
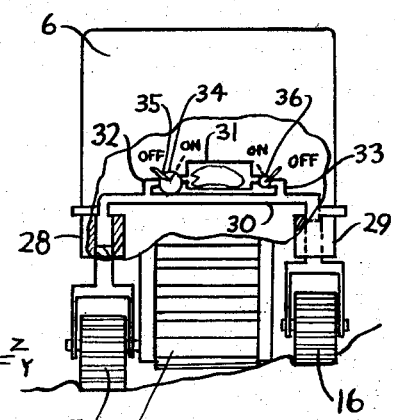
Fig. 2 is a view mostly in section on the line 2—2 of Fig. 1.
Figure 4:
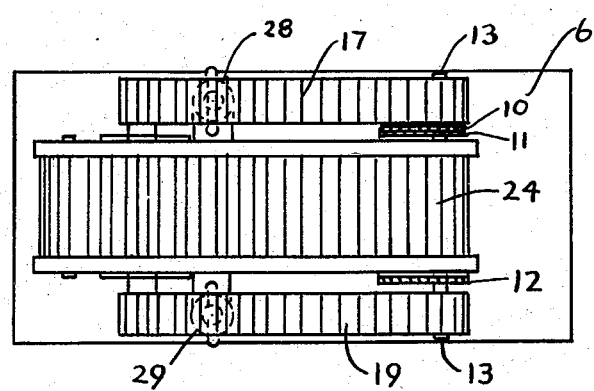
Fig. 4 is a bottom view.
Figure 3:
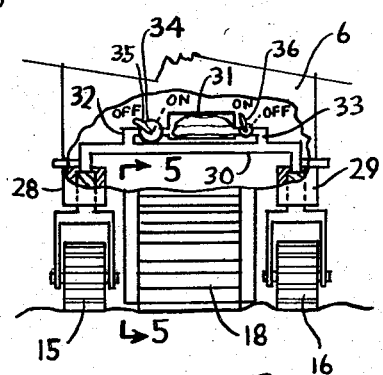
Fig. 3 is a view similar to Fig. 2 except that two valves are shown in different positions for controlling the endless tracks.

Toward the rear of the vehicle, opposite hydraulic stabilizers 28 and 29 are supported from the body 6. These stabilizers are connected by a pipe 30 which passes above the pontoons and permits liquid contained in a tank 31 to flow through said pipe by the following arrangement. One end of the tank is connected by a branch pipe 32 with the pipe 30. The other end of the tank is connected by a branch 33 with the pipe 30. The branch pipe 32 contains a pump 34 and a valve 35. The branch pipe 33 contains a valve 36. The valves 35 and 36 are customary hand operated valves. Fig. 3 shows the position assumed by the side tracks when the valve 36 is opened. This permits liquid to flow from the stabilizers back into the tank and results in causing the two side tracks to aline horizontally with the middle track 18 so that the vehicle will travel on all three tracks. If the valve 35 is opened and the valve 36 is closed, the pump 34 will force the liquid back into the stabilizers which will result in putting the weight of the vehicle entirely on the two side tracks. However if an uneven spot in the terrain is encountered so that one of the side tracks lowers, more fluid will flow into the associated stabilizer thus taking some of the fluid from the opposite stabilizer all of which is illustrated in Fig. 2, and the vehicle will be kept horizontally positioned instead of tilting, and will provide an equal pressure on all of the tracks. Of course a similar equalizing operation would occur if the other side track should lower. In Fig. 1 the line x—x is intended to show the action for one side track, the line y—y shows the action when the vehicle is horizontal, while the line z—z shows the action for the other side track.

The operation and advantages of this invention will be apparent in connection with the foregoing description and the accompanying drawing and have already been indicated.

I claim:

In an amphibious vehicle, the combination of a body member, a power plant mounted on said body member, an axle supported by said body member, a pontoon having its forward end pivoted on said axle, an endless track mounted around said pontoon, driving connections between said power plant and said track for driving said track forwardly around said pontoon, opposite link members embodied in said endless track, grousers connecting said opposite link members respectively, rollers mounted on said pontoon, and a traveling belt held close to the inner surface of said track by said rollers whereby soft material is retained and compressed against said belt to aid in supporting the weight of the vehicle and its tractive effort.

References Cited in the file of this patent

UNITED STATES PATENTS

| Number | Name | Date |
|---|---|---|
| 1,483,762 | Alcorn | Feb. 12, 1924 |
| 2,404,490 | Hait | July 23, 1946 |
| 2,413,850 | Swennes | Jan. 7, 1947 |
| 2,546,523 | Reynolds | Mar. 27, 1951 |

FOREIGN PATENTS

| Number | Country | Date |
|---|---|---|
| 625,338 | Great Britain | June 27, 1949 |
| 739,678 | France | Nov. 3, 1932 |